Patented Nov. 26, 1946

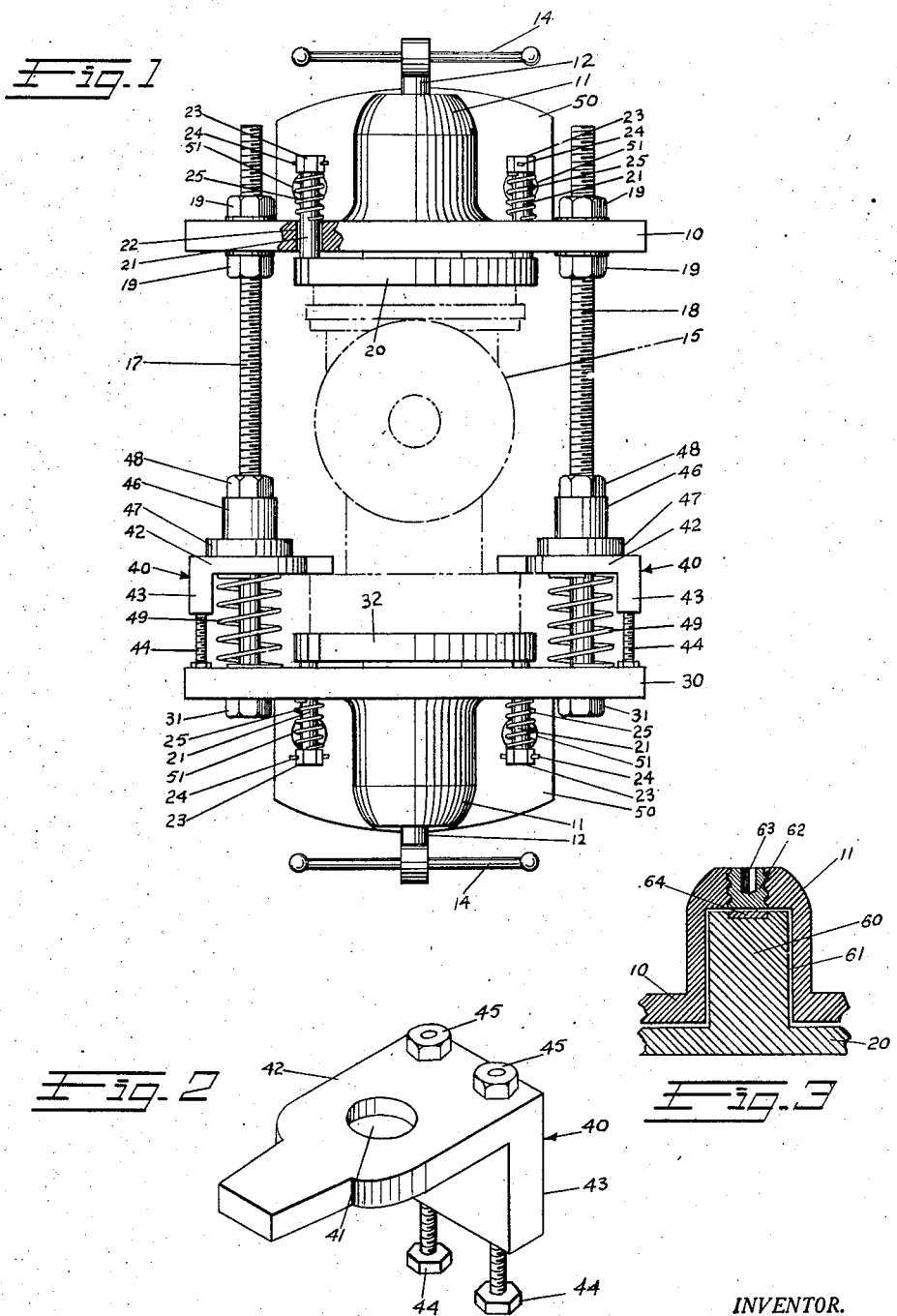

2,411,533

UNITED STATES PATENT OFFICE 2,411,533

CLAMP

Charles P. Feudtner, New York, N. Y.

Application October 4, 1945, Serial No. 620,382

4 Claims. (Cl. 279—110)

(Granted under the act of March 3, 1883, as amended April 30, 1928; 370 O. G. 757)

This invention relates to a clamp for holding objects such as angle and globe valves in machine tools such as lathes.

An object of this invention is to provide a clamp which rigidly holds heavy objects such as valves in a lathe chuck.

Another object is to provide a clamp which will successively hold a series of substantially identical heavy objects one by one for machining in a machine tool, yet which when adjusted to hold the first workpiece will not require readjustment for accurately centering each workpiece as it is inserted and machined.

Another object is to provide a clamp as set forth in the preceding objects, the clamp being of such construction that it is substantially in balance when rotated while holding a workpiece, or which merely requires small counterweights to place it in balance.

Further objects and advantages of this invention, as well as its construction, arrangement and operation, will be apparent from the following description and claims in connection with the accompanying drawing, in which, Figure 1 is a front view in elevation of the clamp, a portion being shown in section for clarity of illustration.

Figure 2 is an isometric view of a strap.

Figure 3 is a partial view in vertical section of the dome.

Referring to the drawing in detail, a preferred embodiment of the invention is illustrated in Figure 1 wherein reference numeral 10 designates a support plate of a generally rectangular configuration. Support plate 10 has a dome 11 which threadedly receives the wrench 12 which is bored for the reception of handle 14. Support plate 10 is also bored to receive threaded studs 17 and 18, plate 10 being secured to studs 17 and 18 by means of nuts 19. On the inner side of plate 10 is a work holding plate 20 which has integral therewith studs 21 which pass through bores 22 in plate 10. Studs 21 have heads 23 fastened thereon by means of pins 24. Interposed between heads 23 and the top of plate 10 are coil springs 25. The bores 22 are of sufficiently large diameter to allow the work holding plate 20 to readily adjust itself to the work being clamped. Positioning of the work holding plate 20 is achieved by means of the screw 12 which bears on the outer surface of work holding plate 20. A similar support plate 30 is located at the opposite end of studs 17 and 18, being held thereon by means of nuts 31. A work holding plate 32, similar to work holding plate 20, is attached to support plate 30.

Work holding plate 20 has integral therewith a piston like extension 60 which is received within the bore 61 of dome 11. Movement of plate 20 is achieved by screw 62 which is turned by wrench 12 when inserted in square socket 63. A wear plate 64 upon which screw 62 bears, is inserted in the top of piston like extension 60 in any suitable manner.

Slidably received on the studs 17 and 18 are straps 40 which are bored at 41 for reception of the studs 17 and 18. Straps 40 have a long side 42 and a short side 43 at right angles to each other. The short side 43 threadedly receives bolts 44 which rest on the support plate 30 and which may be secured to the strap 40 by means of nuts 45. Between the straps 40 and the support plate 10 are bushings 46 having collars 47. Straps 40 are forced toward the work by means of nuts 48 on the studs 17 and 18 which bear against the bushings 46 which in turn force the long side 42 of straps 40 against the work, for example, flanges of a valve. Between the straps 40 and the support plate 30 are coil springs 49 which urge the straps 40 away from the work. It is to be understood that screwing of the bolts 44 as desired into the short sides 43 will adjust the position of the straps 40.

Vertical plates 50 integral with support plates 10 and 30 are provided to enable the clamp to be secured to a lathe chuck as by bolts (not shown) passing through the bores 51.

In the operation of the clamp, the work, for example, a globe valve 15 as shown in phantom lines in Figure 1 is inserted between the work holding plates 20 and 32 which are brought into firm contact with the work by turning wrench 12 and screw 62. The free ends of the long sides 42 of angle plates 40 are then brought into firm contact with the work, as a flange on the globe valve 15, by adjusting nuts 48. The clamp and work is then assembled or secured to a lathe chuck by means of bolts (not shown) which pass through the bores 51 and into the lathe chuck.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A clamp for holding valves comprising a first support and a second support, means to vary the spacing between said supports, work holding plates between said supports, means to provide a floating connection between said supports and said work holding plates, means between said plates to additionally hold the work, and means to force said work holding plates toward the work.

2. A clamp comprising a first support, a second support, bars slidably received by said supports, means on said bars to vary the spaced relationship between said supports, straps, said straps slidably receiving said bars, one leg of said straps contacting the inner surface of one of said supports, and means on said bars to position said straps in clamping position.

3. A clamp comprising a pair of support plates, bores in said plates, studs passing through said bores, means on said studs to hold said support plates in variable spaced relationship, recessed domes on said support plates, a screw in said domes, work holding plates located between said support plates, said work holding plates having headed studs thereon, additional bores in said support plates receiving said headed studs, coil springs on said headed studs between the outer surface of said support plates and the heads of said studs, said work holding plates having pistons received by said domes and in contact with said screws, straps, each of said straps having a bore through one side thereof, said bores receiving said studs, the other side of each of said straps contacting the inner side of one of said support plates, means on said studs to force the bored sides of said straps toward the work, and resilient means to urge the bored sides of said straps away from the work.

4. A clamp comprising a first elongated support plate, a second elongated support plate, said support plates being in a generally parallel relationship, plates at right angles to said support plates at one side thereof and integral therewith, bores adjacent the end of said support plates, threaded studs passing through said bores, nuts on said studs on the outer and inner side of said first support plate to said studs, nuts on said studs on the outer side of second support plate, work holding plates on the inner sides of said support plates and generally parallel thereto, headed studs integral with said work holding plates and passing through said support plates, coil springs between the heads of said headed studs and the outer sides of said support plates, domes in said support plates, recesses in said domes, screws in said domes, pistons on said work holding plates received by said recesses and in contact with said screws, cylindrical bushings slidably received by said threaded studs, said bushings having collars at the ends toward said second support plate, straps having long sides and short sides, the said long sides being bored and slidably received by said threaded studs between said bushings and said second support plates, the short sides of said straps having bolts threaded therethrough, the headed ends of said bolts contacting the inner side of said second support plate, nuts on said threaded studs between said collars and said first support plate, and coil springs on said threaded studs between said straps and said second support plate.

CHARLES P. FEUDTNER.